J. A. BEVERLY.
ANIMAL TRAP.
APPLICATION FILED SEPT. 19, 1914.
1,166,573.
Patented Jan. 4, 1916.
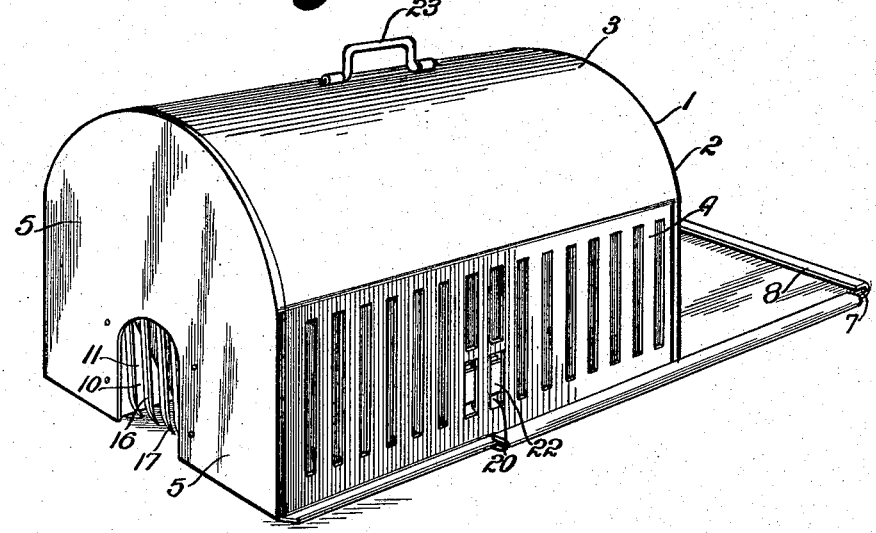
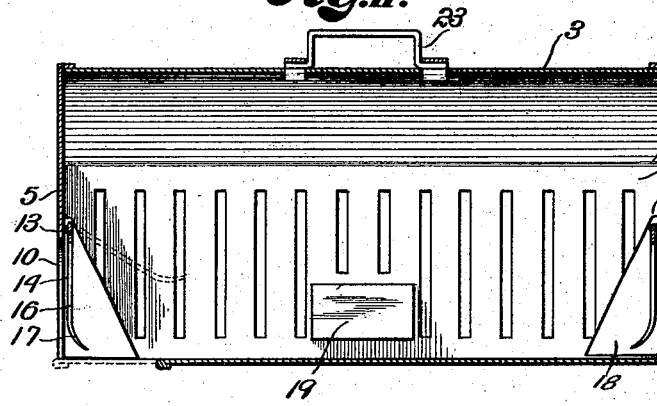
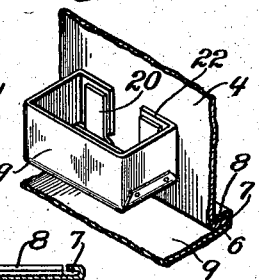
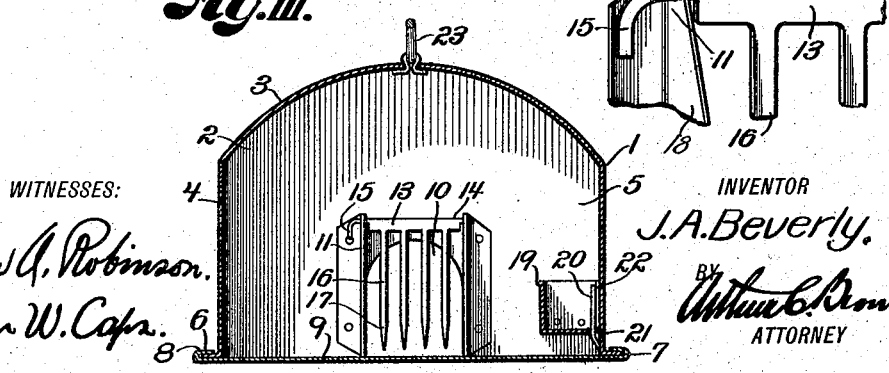
WITNESSES:
INVENTOR
J. A. Beverly.
BY
ATTORNEY

UNITED STATES PATENT OFFICE.

JAMES A. BEVERLY, OF TOPEKA, KANSAS.

ANIMAL-TRAP.

1,166,573. Specification of Letters Patent. Patented Jan. 4, 1916.

Application filed September 19, 1914. Serial No. 862,504.

*To all whom it may concern:*

Be it known that I, JAMES A. BEVERLY, a citizen of the United States, residing at Topeka, in the county of Shawnee and State of Kansas, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to animal traps, and has for its principal object to provide a device of this character that is simple in construction and operation and of such construction that an animal may be enticed thereinto without becoming suspicious of its character.

In accomplishing these objects I have provided the improved details of structure hereinafter described and illustrated in the accompanying drawings, wherein:—

Figure I is a perspective view of a trap constructed according to my invention. Fig. II is a central longitudinal vertical section of the same, with the bottom partly removed. Fig. III is a central vertical cross-section of the trap. Fig. IV is a detail perspective, showing the bait box and its mounting. Fig. V is a detail perspective view of the gate mounting.

Referring more in detail to the drawings, 1 designates a trap constructed according to my invention, comprising a metallic hood 2, having integrally formed top and side members 3—4 and end walls 5. Each of the side walls 4 and one of the end walls is provided, at its lower edge, with an out-turned flange 6 adapted for slidable engagement within inwardly opening sockets 7 formed by the inturned edges 8 of a metallic bottom plate 9, which may be removed from the trap when the latter is in use, in order that the floor of the trap may correspond with that of the surrounding floor, and in order to obviate suspicion of an animal about to enter the trap opening, but which may be easily placed in position to house the bottom of the trap, and carry the animal, or animals that may be caught therein.

In each of the end walls 5 is a central opening 10, and secured to the said walls at the sides of the openings are inwardly projecting flanges 11, having oppositely disposed apertures 12 near their upper ends for hingedly supporting the bars 13 of the swinging gates 14, each bar having down curved ends 15, which keep the bars in place and act as stops to prevent the gates from swinging outwardly through the door openings.

Depending from cross-bars 14 are prongs 16, that are closely spaced across the openings and provided with sharpened lower ends 17, so that an animal, entering the trap by pushing the gate inwardly, is caught by the sharpened prongs if it attempts to back out.

The flanges 11 extend downwardly and inwardly as shown in sections 18 of said flanges; the bottom lines thereof are at right angles to the lower edge of the front of the trap, and project into the interior of the trap a sufficient distance to prevent a caught animal from escaping when another animal opens the gate to enter the trap. I also provide a bait box 19 which is supported on one of the side walls by lips 20 that are stamped inwardly in the wall and form a slot 21 to receive the supporting flanges 22 on the bait box. The hood is also provided with a handle 23 to facilitate its handling.

In using the device, presuming it to be constructed as described, the bait is placed in the box and the bottom plate removed, so that the hood may rest on the ground or floor, and so that when a rat, or other animal, approaches the hood entrance, it will not be suspicious of the device, owing to the fact that there is no tin or otherwise unfamiliar footing to step upon as it enters the trap. When the animal starts to enter the trap, it pushes against the gate, which hangs loosely on its pivotal mounting and swings freely into the trap and allows the animal to pass therebeneath. Should the animal, however, attempt to back out of the trap after it has started to enter, the inturned prongs on the lower end of the gate will catch in its neck or back and prevent its exit. After the animal has passed beneath the gate into the trap, the gate automatically closes by swinging back into the opening and the animal is confined within the trap, but without interfering with the entrance of another animal thereinto, in this way adapting the trap for catching any number of animals without resetting. When the trap is to be emptied, the bottom member is slipped to place by projecting the same beneath the trap with the edge lips of the bottom under the flanges at the bottom edges of the trap sides; the bottom member being moved beneath the animals confined within the trap, so that when the bottom is in place and the trap lifted, the animals are supported on the removable bottom member.

It is readily apparent that animals may be removed from the trap by merely withdrawing the bottom member and allowing the animals to drop therefrom, and that a narrow or relatively large opening may be made for the escape of the animals, so that but one or two may escape at a time, or if desired, all of the animals may be dropped at once by completely removing the bottom.

Having thus described my invention, what I claim as new therein, and desire to secure by Letters-Patent, is:

A trap comprising a metallic hood having outturned flanges at its lower edge and having end openings therein, a bottom plate having inturned edges to form inwardly opening sockets to slidably engage said outturned hood flanges, inwardly projecting flanges secured at the sides of said hood openings and having oppositely disposed apertures at their upper ends, a crossbar having a down-turned outer end revolubly mounted in said apertures, downwardly porjecting prongs secured to said crossbar and having inwardly curved and sharpened lower ends, a bait box mounted within said hood, and a handle on said hood, for the purpose set forth.

In testimony whereof I affix my signature in presence of two witnesses.

JAMES A. BEVERLY.

Witnesses:
 LYNN A. ROBINSON,
 RETTA F. THOMAS.

Copies of this patent may be obtained for five cents each, by addressing the "Commissioner of Patents, Washington, D. C."